(12) United States Patent
Harrenstein

(10) Patent No.: US 8,505,062 B1
(45) Date of Patent: *Aug. 6, 2013

(54) METHOD AND SYSTEM FOR ENABLING USERS TO SUGGEST CHANGES TO VIDEO CAPTIONS OVER THE WEB

(75) Inventor: Kenneth Harrenstein, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/173,955

(22) Filed: Jun. 30, 2011

Related U.S. Application Data

(63) Continuation of application No. 11/979,920, filed on Nov. 9, 2007, now Pat. No. 7,992,183.

(51) Int. Cl.
- *H04N 7/08* (2006.01)
- *H04N 7/10* (2006.01)
- *G06F 3/00* (2006.01)
- *G06Q 30/00* (2012.01)

(52) U.S. Cl.
USPC ............................. 725/137; 725/36; 715/703

(58) Field of Classification Search
USPC .................. 725/137, 36; 715/703; 705/14.72, 705/14.73, 14.41, 14.4
See application file for complete search history.

(56) References Cited

U.S. PATENT DOCUMENTS

| | | |
|---|---|---|
| 2001/0029583 A1 | 10/2001 | Palatov et al. |
| 2005/0010409 A1 | 1/2005 | Hull et al. |
| 2007/0282675 A1* | 12/2007 | Varghese ........................ 705/14 |
| 2009/0070673 A1* | 3/2009 | Barkan et al. ................. 715/716 |
| 2009/0083462 A1 | 3/2009 | Song et al. |
| 2010/0138852 A1 | 6/2010 | Hirsch et al. |

FOREIGN PATENT DOCUMENTS

| | | |
|---|---|---|
| WO | WO2008/032184 | 3/2008 |

OTHER PUBLICATIONS

Overstream, Inc.; "Overstream—Welcome"; 2007. Downloaded from http://www.overstream.net/ on Nov. 9, 2007, (2 pages).
Overstream, Inc.; "What is Overstream?"; 2007. Downloaded from http://www.overstream.net/whatisoverstream.php on Nov. 9, 2007, (2 pages).
Overstream, Inc.; "Browse Overstreams"; 2007. Downloaded from http://www.overstream.net/browse.php on Nov. 9, 2007, (4 pages).
Overstream, Inc.; "Overstream Help"; 2007. Downloaded from http://www.overstream.net/help.php on Nov. 9, 2007, (2 pages).
Overstream, Inc.; "About Overstream.net: Official"; 2007. Downloaded from http://www.overstream.net/aboutoverstream_official.php on Nov. 9, 2007, (2 pages).

(Continued)

*Primary Examiner* — Hoang-Vu A Nguyen-Ba
(74) *Attorney, Agent, or Firm* — Lowenstein Sandler LLP

(57) ABSTRACT

This invention relates to systems and methods for enabling users to create, to edit and to rate online video timed text over the web. A system embodiment of this invention includes a permission requester that enables a first user to make a permission request. The permission request requests permission from a second user to create a timed text track for a video. A permission granter enables the second user to make a permission response according to the permission request from the first user. A timed text editor enables the first user to create a timed text track for the video based on the response to the permission request and upload the timed text track to a server.

18 Claims, 13 Drawing Sheets

(56) References Cited

OTHER PUBLICATIONS

*About.com: Deafness*, "Accessibility-Web Video Captioning Technologies," http://deafness.about.com/cs/accessibility/a/webvideo.htm, Nov. 2, 2007, Downloaded from Wayback Machine (web.archive.org) on Apr. 29, 2011, 2 pages.

"Project ReadOn: How It Works," http://www.projectreadon.com/index.php?pg=howitworks. Mar. 3, 2008. Downloaded from Wayback Machine (web.archive.org) on Apr. 28, 2011, 1 page.

"Project ReadOn: Home Page," http://www.projectreadon.com. Oct. 31, 2007. Downloaded from Wayback Machine (web.archive.org) on Apr. 29, 2011, 2 pages.

2005 Microsoft Corporation, "Windows Media Connect FAQ," archived on Apr. 27, 2005, accessed at http://www.microsoft.com/windows/windowsmedia/devices/wmconnect/faq.aspx, 9 pages.

* cited by examiner

FIG. 13

Caption Preferences for Video 4 — 1302

☒ Captions On
○ Captions Off

| Captioner | Language | Enabled | Disabled |
|---|---|---|---|
| Josh M | English | ☒ | ○ |
| Kim L | English | ○ | ☒ |
| J Doe | English | ○ | ○ |
| Pierre S | Francais | ☒ | ○ |
| Jose K | Espanol | ☒ | ○ |
| Max P | Deutsch | ☒ | ○ |

Submit

METHOD AND SYSTEM FOR ENABLING USERS TO SUGGEST CHANGES TO VIDEO CAPTIONS OVER THE WEB

This application is a continuation of U.S. patent application Ser. No. 11/979,920, filed Nov. 9, 2007, which is incorporated by reference herein in its entirety.

BACKGROUND OF THE INVENTION

1. Field of the Invention

This invention relates to captioning online video.

2. Related Art

Video content can include audio, such as dialogue, music, and other sound. Timed text (TT), such as a caption or subtitle, is sometimes provided with video content. Timed text can serve a number of purposes. First, timed text can make the dialogue understandable to the hearing impaired. Second, timed text can translate the audio for those who do not understand the language of the dialogue. Third, timed text can make the video understandable in environments where audio is unavailable or not permitted. Finally, timed text can provide commentary to video with educational or entertainment value.

Video is increasingly being accessed by remote users over networks, such as the Internet. The rise of the World Wide Web including various web applications, protocols, and related networking and computing technologies has made it possible for remote users to view and to play video. Many of videos available through the World Wide Web lack timed text.

The many users of the World Wide Web provide the opportunity for collaboration. Users can create content, share that content, and allow others to improve on that content. In at least one case, this has allowed users to collaborate to create an online encyclopedia (e.g., Wikipedia). However, allowing users to create their own content can lead to vandalism or unwanted advertising, known as spam.

Systems and methods are needed to enable users to collaborate over the web to create timed text for online video, while minimizing the risk of vandalism.

BRIEF SUMMARY

This invention relates to systems and methods for enabling users to create, to edit and to rate online video timed text over the web. A system embodiment of this invention includes a permission requester that enables a first user to make a permission request. The permission request requests permission from a second user to create a timed text track for a video. A permission granter enables the second user to make a permission response according to the permission request from the first user. A timed text editor enables the first user to create a timed text track for the video based on the response to the permission request and upload the timed text track to a server.

A method embodiment of this invention includes: (1) enabling a first user to make a permission request from a second user to create a timed text track for a video; (2) enabling the second user to make a permission response to the permission request from the first user; and (3) enabling the first user to create a timed text track for the video based on the response to the permission request and to upload the timed text track to a server.

A system embodiment of this invention for includes a change suggester that enables a first user to suggest changes to a timed text track. A timed text editor that enables a second user to change the timed text track for the video based on the changes suggested by the first user.

A method embodiment of this invention includes: (1) enabling a first user to suggest changes to a timed text track; and (2) enabling a second user to change the timed text track for the video based on the changes suggested by the first user.

By providing ways to request/grant permission to create timed text and to suggest changes for improvement of timed text, embodiments of this invention enable users to collaborate over the web to create timed text for online video, while minimizing the risk of vandalism. This collaboration will foster the creation of additional high-quality timed text for online video. The additional timed text will: (1) make the dialogue understandable to the hearing impaired; (2) translate for those who do not understand the language of the dialogue; (3) make the video understandable in environments where audio is unavailable or not permitted; and (4) provide commentary to video with educational or entertainment value.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements.

FIG. 13 shows an example user interface for the content producer to minimize the risk of vandalism to timed text related to a video, which may be used by the system in FIG. 1.

DETAILED DESCRIPTION OF EMBODIMENTS

The present invention relates to systems and methods that enable users to create, to edit and/or to rate online video timed text. The systems and methods allow collaborate across the Internet in creating and improving timed text. By providing ways to collaboration, embodiments of this invention enable users to create timed text for online video, while minimizing the risk of vandalism. This collaboration will foster the creation of additional high-quality timed text for online video.

In the detailed description of the invention herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The term "content producer" used herein refers to the individual who may upload the video. The content producer may be responsible for certain administrative functions related to the video.

The term "captioner" used herein refers broadly to anyone who authors timed text other than the content producer.

The term "viewer" used herein refers broadly to anyone viewing timed text who may rate or suggest changes to an online captioned video.

This detailed description of embodiments divided into sections. The first section describes a system according to an embodiment of the invention. The second section describes a method that may be used in operation of the system to add a caption. The third section describes an example user interface display according to the method to add a caption. The fourth section describes a method to suggest changes or to rate a video caption. The fifth section describes an example user interface that may be used according to the method to suggest changes to the caption. The sixth section is an example user interface for the content producer to define preferences for timed text for the video.

System

Figure 1:
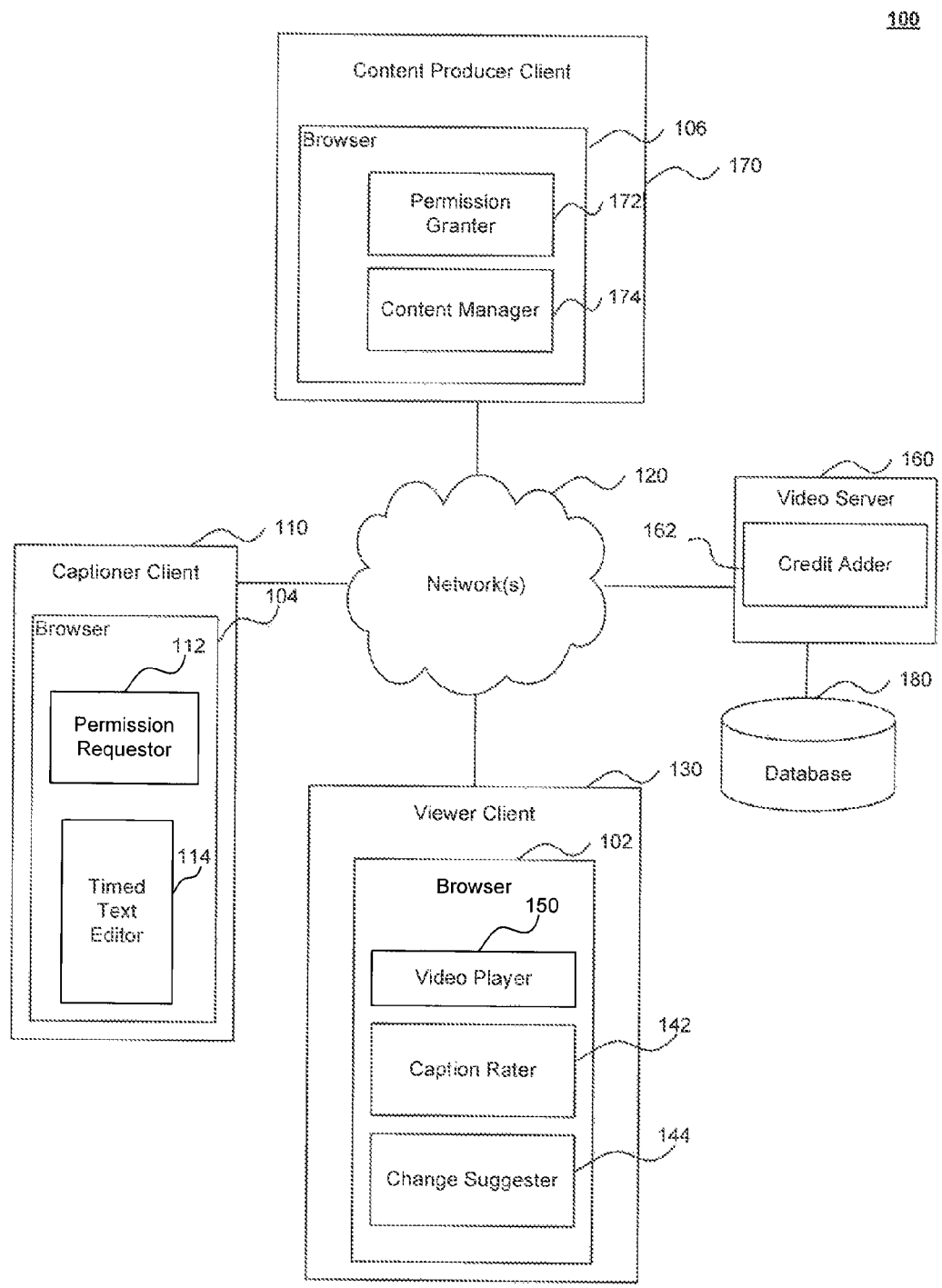
FIG. 1 is an architecture diagram of a system according to an embodiment of this invention.

This section describes the system according to an embodiment of this invention with respect to FIG. 1.

FIG. 1 is an architecture diagram of a system according to an embodiment of this invention. FIG. 1 contains a system 100. System 100 contains a content producer client 170, a video server 160, a viewer client 130, and a captioner client 110, all connected using one or more networks 120. Video server 160 may be coupled to database 180.

Video server 160 is a server which may deliver video content along with other data to the various clients. Video server 160 may contain a web server. A web server is a software component that responds to a hypertext transfer protocol (HTTP) request with an HTTP response. As illustrative examples, the web server may be, without limitation, Apache HTTP Server, Apache Tomcat, Microsoft Internet Information Server, JBoss Application Server, WebLogic Application Server, or Sun Java System Web Server. The web server may serve content such as hypertext markup language (HTML), extendable markup language (XML), documents, videos, images, multimedia features, MACROMEDIA Flash programs, or any combination thereof. This example is strictly illustrative and does not limit the present invention.

In an embodiment, video server 160 may receive a user interface encoded in an HTML or FLASH file generated according to an HTTP request from a client. Video server 160 may then send the HTML or Flash file to a client as an HTTP response. When the client receives the HTTP response, the client renders the user interface to the user. The user interface, for example, may enable the user to request permission to create timed text for the video, to grant permission to create timed text for the video, to rate the timed text, or to suggest to the timed text.

Video server 160 also contains a credit adder 162. Credit adder 162 adds a credit to the video according to the creator of the timed text track when a new timed text track is created.

Video server 160 may be coupled to a database 180. Database 180 may be a relational database. Database 180 may store multimedia content such as video, time text tracks, user information, or any other necessary data.

Captioner client 110 is a client enabling a captioner to create a timed text track. To create a timed text track, the captioner must first request permission from the content producer. Captioner client 110 contains a browser 104, a permission requestor 112 and a timed text editor 114. In an embodiment, browser 104 receives an HTTP response containing a file. As an example, the file may be encoded in HTML or Flash. The browser may interpret the file to instantiate a permission requestor 112 and a timed text editor 114.

Permission requestor 112 enables the user to request permission to create a timed text track. In an example, permission requestor 112 may provide a form in which the user can enter the data. When the user selects a submit button, permission requestor 112 sends the data to video server 160. The data may include the language of the timed text track, a message to the content producer, and (optionally) a proposed price for the captioning services.

Once permission has been granted, time text editor 114 enables the captioner to create a timed text track. More information on the operation of permission requestor 112 and timed text editor 114 is provided below.

Viewer client 130 contains a browser 102, a video player 150, a timed text rater 142, and a change suggester 144. In an embodiment, browser 102 receives an HTTP response containing a file. As an example, the file may be encoded in HTML or Flash. Browser 102 may interpret the file to instantiate video player 150, timed text rater 142, and change suggester 144.

Video player 150 enables a user to play a video and a corresponding time text track. In one embodiment, video player 150 may be instantiated by a browser plug-in using a Flash file. Video player 150 may stream video to a viewer over the Internet. As a result, the viewer does not need to store the video in its entirety before playing. Video player 150 may also include various controls, for example, traditional video controls as well as controls to view a timed text track. Some controls may include buttons, dropdown menus, and other controls known in the art.

Timed text rater 142 enables a user to rate a timed text track. In an example, timed text rater 142 may present the user with an form. When the user makes a selection, timed text rater 142 sends the rating to video server 160. Video server 160 may then average that rating with other ratings.

Change suggester 144 enables a user to suggest changes. In an example, change suggester 144 may present the user with a form. The user may enter data and press the submit button. More information on the operation of video player 150, timed text rater 142, and change suggester 144 is provided below.

Content producer client 170 contains a browser 106, a permission granter 172, and a content manager 174. In an embodiment, browser 106 receives an HTTP response containing a file. As an example, the file may be encoded in HTML or Flash. Browser 106 may interpret the file to instantiate permission granter 172 or content manager 174. Permission granter 172 enables a content producer to grant permission to a captioner to add timed text. Content manager 174 enables a content producer to disable the permission requester for a particular video. More information about the operation of permission granter 172 and content manager 174 is provided below.

By requiring permission from a content producer before the captioner can add a caption, system 100 enables users to collaborate over the web to create timed text for online video, while minimizing the risk of vandalism. This collaboration fosters the creation of additional high-quality timed text for online video.

Each of content producer client 170, video server 160, viewer client 130, captioner client 110 may be implemented on any computing device that can communicate over a network. Examples of a computing device include, but are not limited to, a computer, workstation, distributing computing system, embedded system, stand alone electronic device, network device, local device, rack server, television, or other type of computer system. A computing device may also include a user interface. The user interface may include a user interface display and an input device. As an illustrative example, the user interface display may be a computer screen. The input device may include a mouse that allows the user to make a selection on the user interface display. In another example, the user interface may allow the user to make a selection using a keyboard or touch screen. These examples are merely illustrative and are not intended to limit the invention.

Network 120 can be any network or combination of networks that can carry data communication. Such network 120 can include, but is not limited to, a local area network, medium area network, and/or wide area network such as the Internet. Network 120 can support protocols and technology including, but not limited to, World Wide Web protocols and/or services. Intermediate web servers, gateways, or other servers may be provided between components of system 100 depending upon a particular application or environment.

Each of video player 150, timed text rater 142, change suggester 144, permission requestor 112, timed text editor 114, permission granter 172, credit adder 162, content manager 174 and browsers 102, 104, and 106 may be implemented in hardware, software, firmware or any combination thereof.

Method for Captioner to Add a Caption

Figure 2:
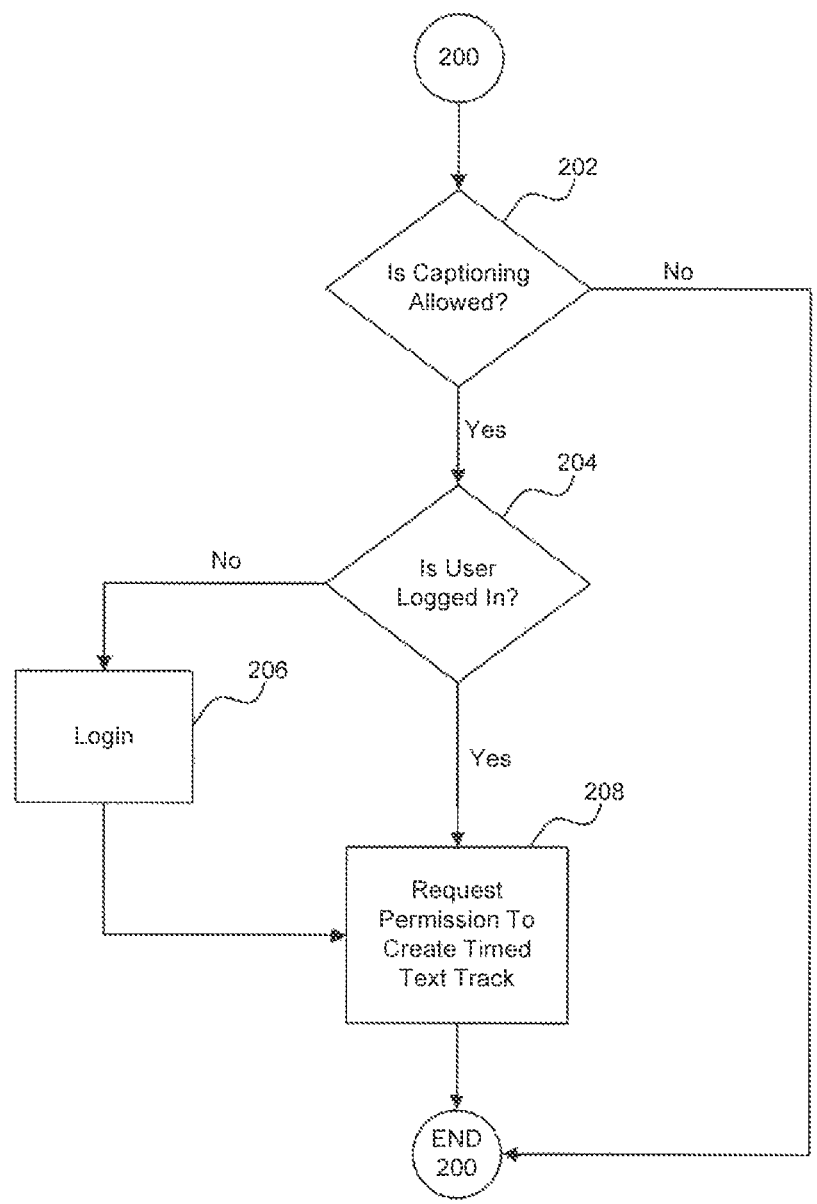
FIG. 2 shows a flowchart illustrating a method to request permission to create timed text, which may be used by the system in FIG. 1.
Figure 3:
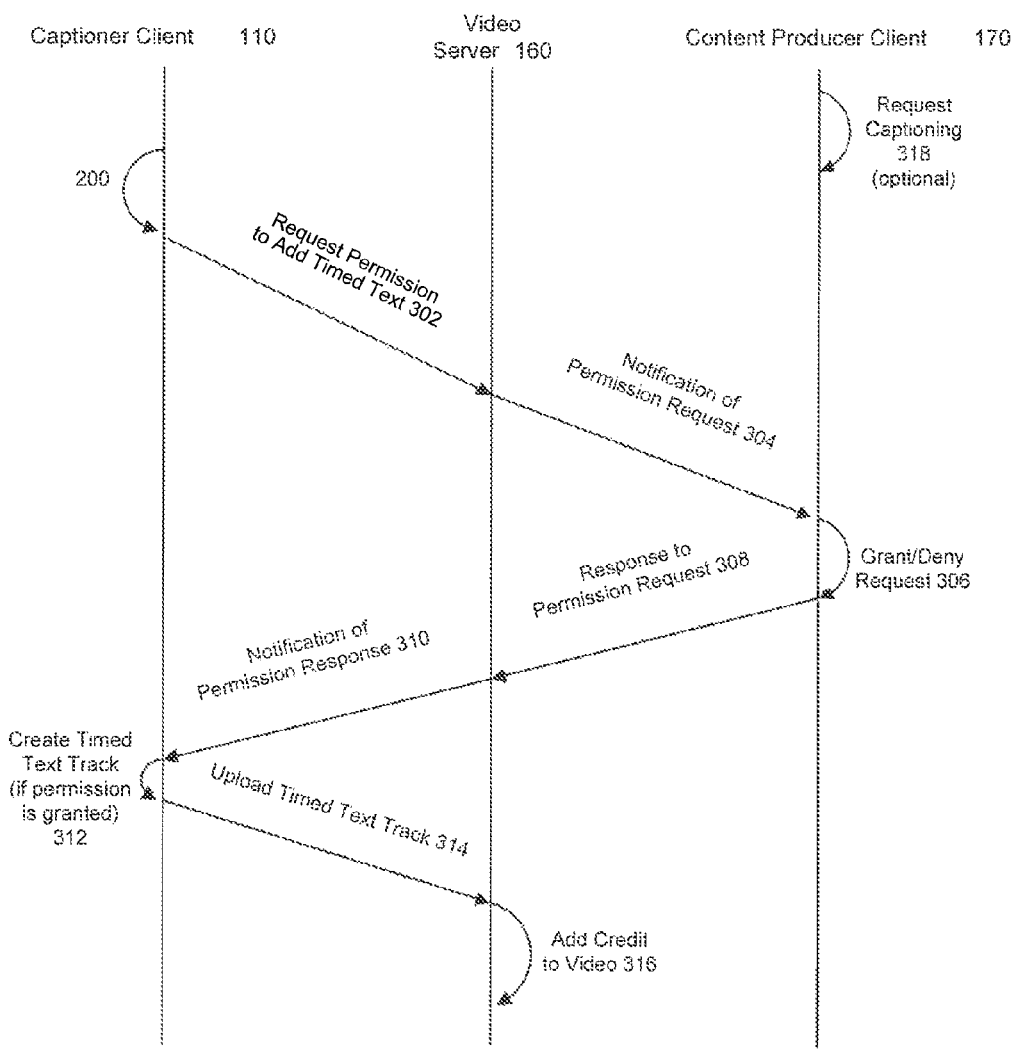
FIG. 3 shows a sequence diagram illustrating a method for adding timed text, which may be used by the system in FIG. 1.

This section describes a method that may be used in operation of system 100 to add a caption with respect to FIGS. 2 and 3.

FIGS. 2 and 3 illustrate a method for adding a caption according to an embodiment of this invention. For clarity, the method is described with respect to the operation of system 100. However, the method should not be interpreted to be limited to system 100.

FIG. 2 contains a routine 200. Routine 200 may be, for example, executed during the operation of captioner client 110. Routine 200 begins by evaluating if captioning is allowed for a particular video at decision gate 202. The content producer may have the ability to allow or to disallow captioning. This is discussed in more detail below.

If captioning is not allowed for a particular video, then the routines ends. Otherwise, routine 200 goes on to ask whether the user is logged in at decision gate 204. If the user is already logged in, then control proceeds to step 208. Otherwise, the user must log in at step 206. Logging in may consist of any authentication technique. Well known web-authentication techniques include password authentication, biometric authentication, and authentication with digital certificates.

Once the user logs in at step 206, control proceeds to step 208. Step 208 requests permission to create timed text. This may consist of an HTTP request over a network 120 to video server 160. This step may, for example, may be executed by permission requester 112 in FIG. 1. Permission requester 112 may present the user with a user interface, may accept input data from the user, and send that data over network 120 to video server 160. An example user interface presented by permission requester 112 is described below.

FIG. 3 shows a sequence diagram 300 illustrating a method, which the various servers may use to add a timed text track to a video. Again, for clarity the sequence diagram describes method 300 with respect to system 100. However, method 300 is not meant to be limited to system 100.

First, captioner client 110 executes routine 200 as shown in FIG. 2. When permission requestor 112 executes step 208, permission requestor 112 sends a permission request to add timed text track 302. Permission request 302 may be an HTTP request to video server 160. That HTTP request may contain HTTP parameters. The parameters may include information such as a language for the requested timed text track, a message relating to the request for permission, or (optionally) a price for captioning services.

When video server 160 receives permission request 302, video server 160 sends a notification of permission request 304 to content producer client 170. Notification 304 may, for example, be an email, Short Message Service (SMS) message, or chat message. Notification 304 may include information such as the language of the requested timed text, the message in the request, the price proposed in the request, a rating of the requesting captioner, and a number of spam reports relating to the captioner. The rating of the requesting captioner may be calculated by averaging the ratings for all the timed text tracks that the user has created. The ratings for the timed text tracks may be created by viewers rating the timed text tracks. The number of spam reports relating to the captioner may be calculated by summing all the spam reports submitted by viewers relating to all the timed text tracks. Rating the timed text tracks and submitting spam reports is described in more detail below.

Based on the information in notification 304, a content producer may either grant or deny the request at 306. Permission granter 172 may enable the content producer to grant or to deny the request. As an example, notification 304 may contain a URL addressing video server 160. When the content producer enters the address in browser 106, browser 106 may download an HTML file and instantiate permission granter 172. Permission granter 172 may provide input controls for the content producer to grant or to deny the permission request. When the content producer selects the submit button, a response to the permission request 308 is sent to video server 160. Response 308 indicates whether the content producer granted or denied the permission request.

At this point, video server 160 may send a notification of permission response 310 to captioner client 110. Notification 310 may be, for example, an email, Short Message Service (SMS) message, or chat message. If permission is granted the captioner may create the timed text track at 312 using captioner client 110. The resulting timed text track is uploaded at 314 to video server 160.

By requiring permission from a content producer before the captioner can add a timed text track, method 200 and method 300 enable users to collaborate over the web to create timed text for online video, while minimizing the risk of vandalism. This collaboration fosters the creation of additional high-quality timed text for online video.

Video server 160 stores the timed text track for other users to view. Video server 160 may add a credit to the video 316. In an embodiment, credit adder 162 adds the credit to the video. By adding a credit to the video the captioner is identified along with the timed text. This may reduce the potential for vandalism as the captioner will be identified with the timed text track. Similarly, the captioner may take pride in his timed text and wish to maintain a good reputation among viewers.

Example User Interface to Add a Caption

Figure 4:
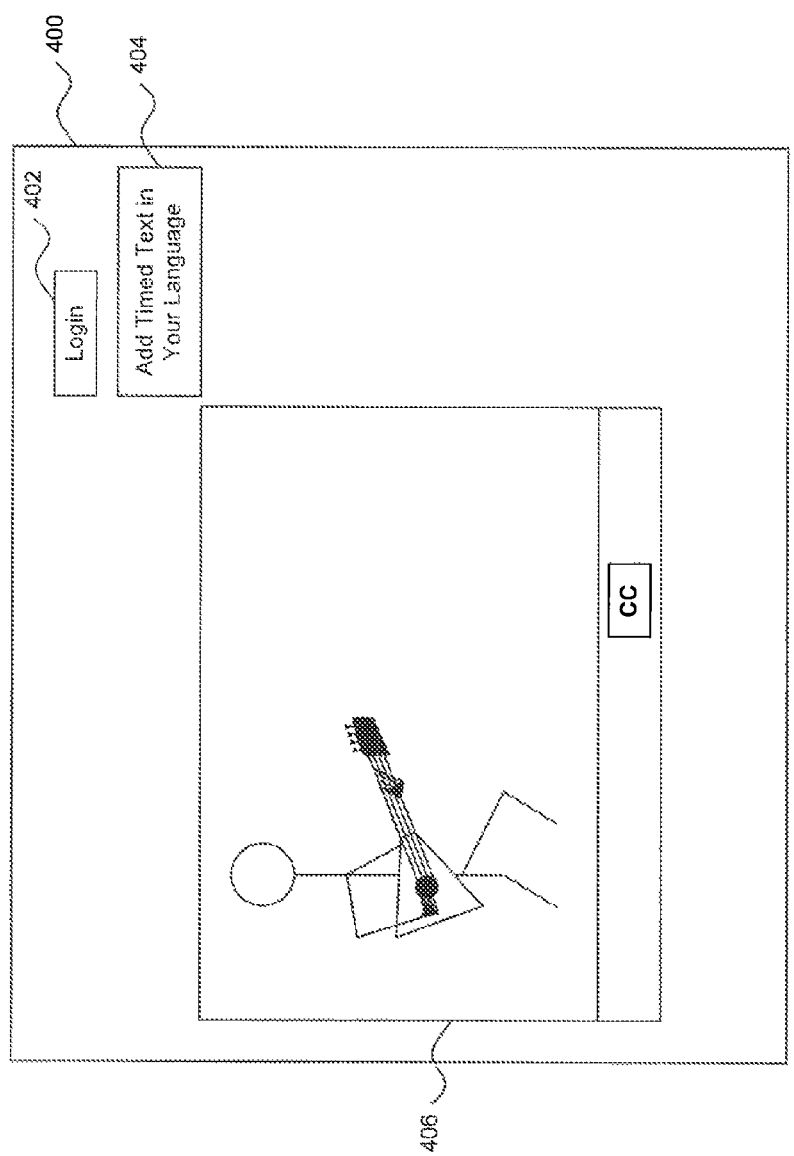
FIGS. 4-6 illustrate an example user interface display that allows the captioner to add timed text according to the methods shown in FIG. 2 and FIG. 3.
Figure 5:
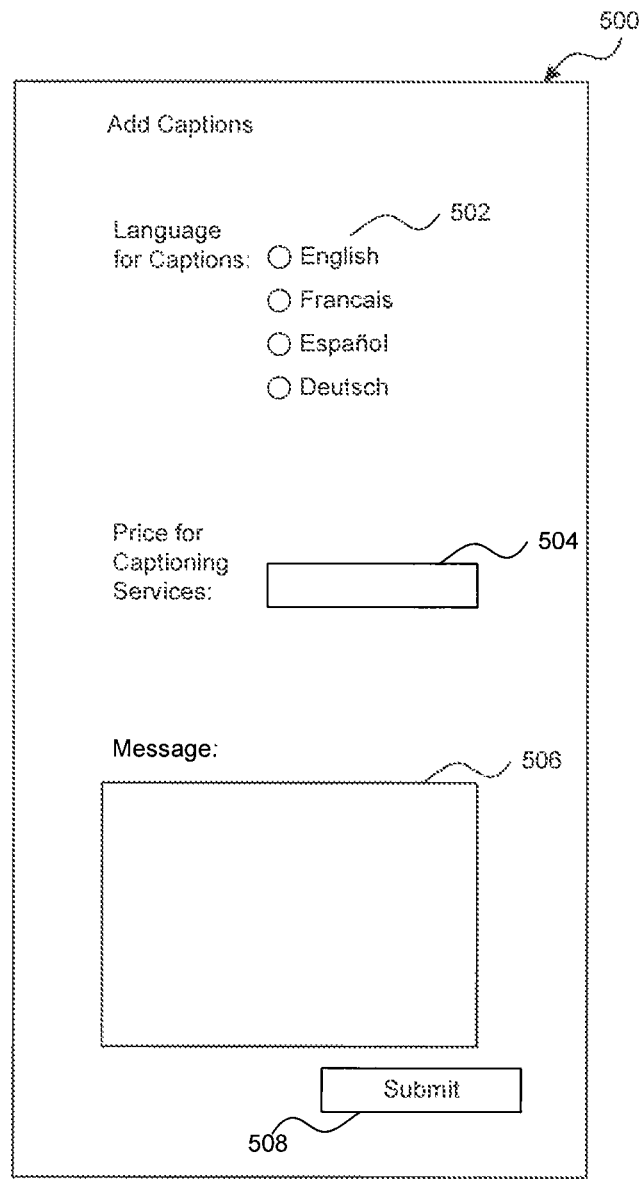
Figure 6:
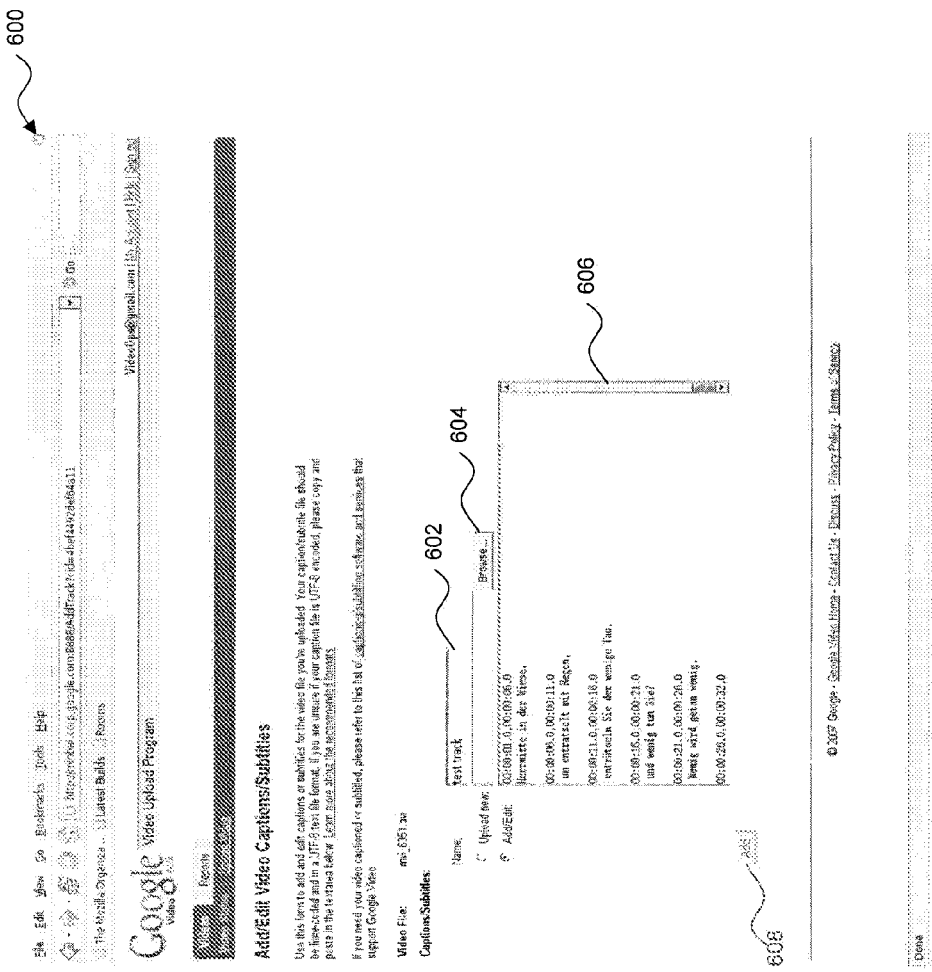

This section describes an example user interface display according to method 200 and 300 with respect to FIGS. 4-6.

FIG. 4 contains example display 400. The example display 400 contains a login button 402, an add timed text button 404, and a video viewer 406. Pressing login button 402 may display a form that will allow the user to enter credentials to log in. Logging in may be done with any web authentication technique.

Video viewer 406 shows a video. When selected, add caption button 404 initiates a form such as is shown in FIG. 5. The form enables a user to request permission to add timed text to the video shown in video viewer 406.

FIG. 5 shows example user interface 500. User interface 500 may, for example, be displayed by permission requester 112 on captioner client 110 in FIG. 1.

User interface 500 contains a radio button 502, a text box 504, a text box 506, and a submit button 508. Radio button 502 is an input enabling the user to select the language in which he intends to create a timed text track. Text field 506 enables the user to enter a message. The message will be sent to content producer to assist in his/her decision to grant or to deny permission to create the timed text track. Optionally, text box 504 enables the captioner to propose a price for captioning services as shown at 504. When submit button 508 is selected, permission requester 112 may send the data entered in radio button 502, text field 504, and text field 508. In an embodiment, permission requester 112 may send the data packaged in request 308, over a network 120 to video server 160 as shown in FIGS. 1 and 3.

By requiring permission from a content producer before the captioner can add a caption, the example user interface minimizes the risk of vandalism when users collaborate over the web to create timed text for online video. This collaboration fosters the creation of additional high-quality timed text for online video.

Supposing the content producer grants permission to the captioner, the captioner may have the ability to add a timed text track to a video. FIG. 6 shows an example user interface 600 enabling the captioner to create a timed text track. User interface 600 may be displayed, for example, by timed text editor 114. User interface 600 includes a text box 602, a file input 604, a text field 606, and a submit button 608. Text box 602 enables the captioner to enter a name for the timed text track. If the captioner has a text file for the timed text track, he or she can upload it using file input 604. Alternatively, the user may edit timed text information in text field 606. In one example, timed text may be entered as alternating lines corresponding to lines of text a captioner wishes to have appear during the video playback (see e.g., text field 606).

When a captioner selects submit button 608, timed text editor 114 may send the data entered on the form. As an example, timed text editor 114 may upload timed text track 312 across network 120 to video server 160, as shown in FIGS. 1 and 3.

Method of Operation for Viewer to Suggest Changes and to Rate Timed Text

Figure 7:
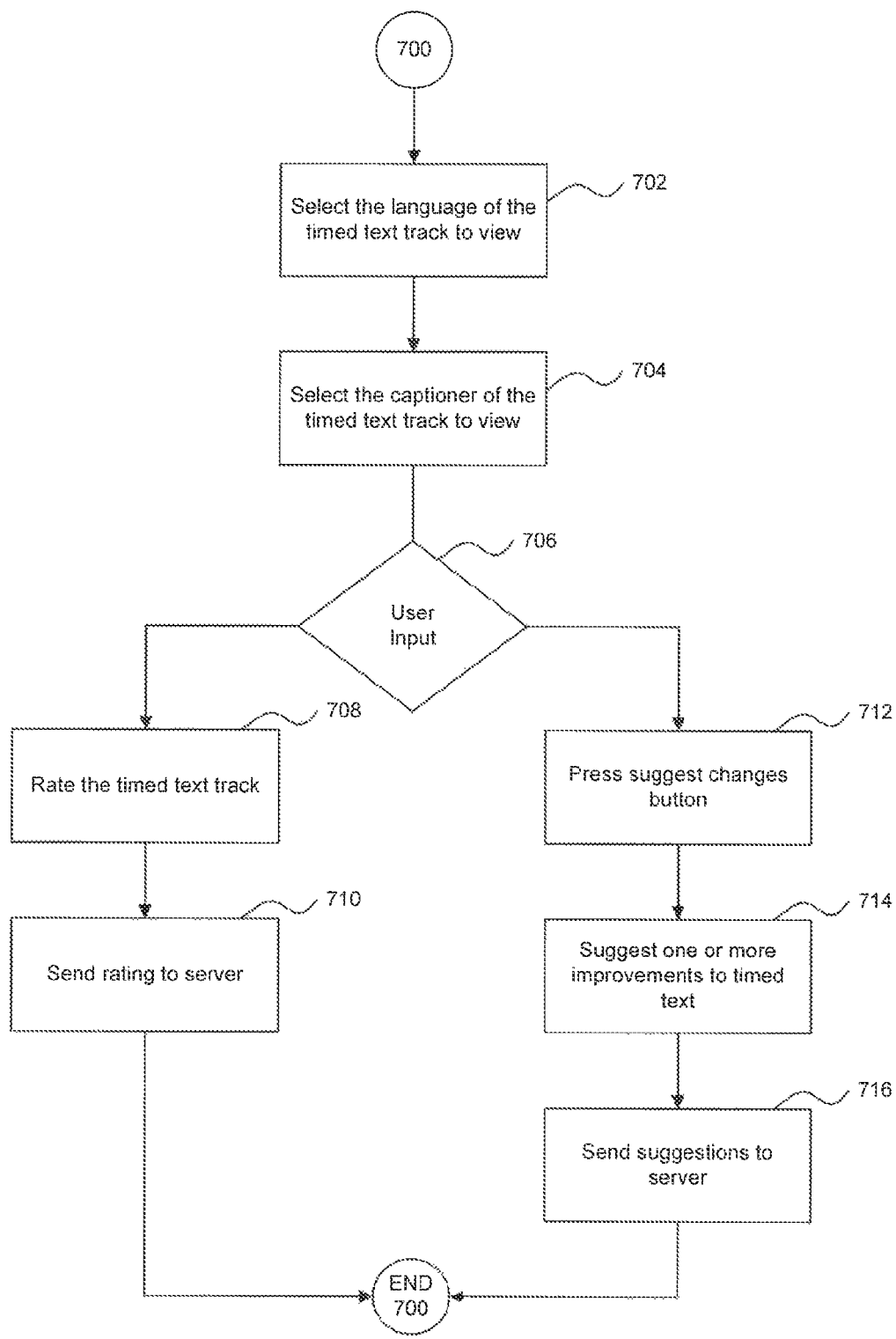
FIG. 7 shows a method for rating and suggesting changes to timed text, which may be used by the system in FIG. 1.
Figure 8:
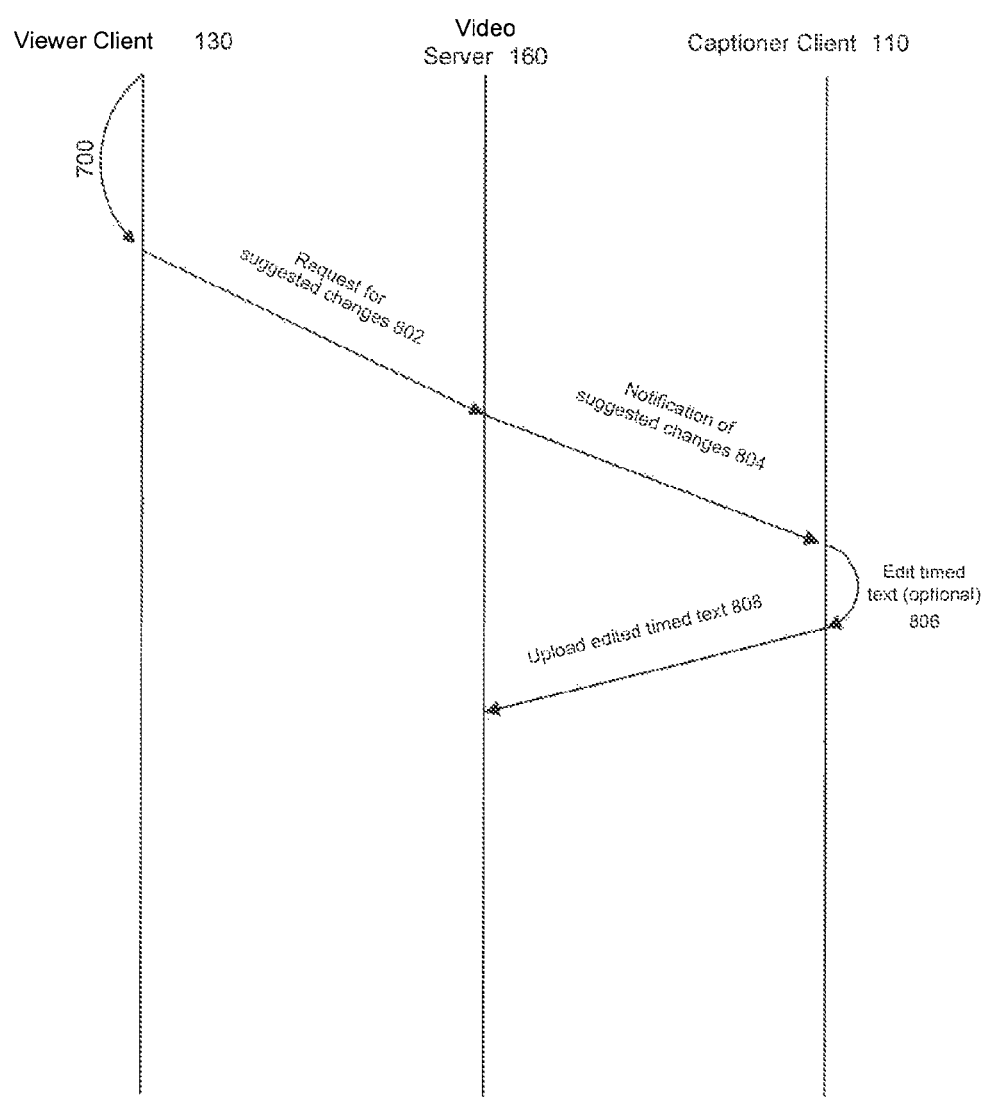
FIG. 8 shows a sequence diagram which may be used to rate and to suggest changes to timed text, which may be used by the system in FIG. 1.

This section describes a method to suggest changes or to rate a video caption, which may be used in operation of system 100, with respect to FIGS. 7 and 8.

FIG. 7 shows an example operation of client viewer 130, and FIG. 8 is a sequence diagram showing how the various components and system 100 may communicate to rate or suggest changes to a timed text track. Although the operation in FIGS. 7 and 8 is described with respect to system 100 for clarity, the method is not meant to be limited to system 100.

FIG. 7 contains routine 700. In an embodiment, routine 700 may be executed in operation of viewer client 130. Routine 700 is begins at step 702 when the user selects the language of the timed text to view. Once the view has selected the language of the timed text track to view, the user may select the captioner of the timed text track to view at step 704. At step 706, the user may make an input on a user interface. Different actions are taken depending on the input. An example, at step 708 the user may rate the timed text track selected. Once the user has rated the timed text track selected at step 708, the rating is sent at step 710. In an embodiment, caption rater 142 may enable the user to select a rating and may send the rating to video server 160, as shown in FIG. 1.

As an alternative, the user may press a suggest changes button at step 712. Once the user presses the suggest changes button at step 712, the user may suggest one or more suggestions to timed text track at step 714. The suggestions may be sent at step 716. In an embodiment, change suggester 144 may enable the user to select a rating and may send the rating to video server 160, as shown in FIG. 1. An example is described in detail below.

FIG. 8 contains a sequence diagram 800. Sequence diagram 800 shows how the various components of system 100 may communicate with each other to suggest changes and make those changes to the timed text track. Sequence diagram 800 begins with client viewer 130 executing routine 700. After routine 700 is complete, client viewer 130 sends a request for suggested changes 802 over network 120. Request 802 may be, for example, an HTTP request to video server 160.

Video server 160 may then send a notification of suggested changes 804 to captioner 110. Notification 804 may be, for example, an email, Short Message Service (SMS) message, or chat message. Captioner 110 may either ignore those suggested changes or may edit the timed tracks to match the suggest changes at 806. Supposing the captioner does make the changes to the timed text, that new edited timed text is uploaded to video server 160 at 808.

At this point the modified timed text are uploaded to the server and viewers may view the timed text and may suggest changes to the new, edited timed text.

By enabling viewers to suggest changes to a caption and requiring the captioner's approval of the changes, method 700 and method 800 enable users to collaborate over the web to create timed text for online video, while minimizing the risk of vandalism. This collaboration fosters the creation of additional high-quality timed text for online video.

Example Display Interfaces to Suggest Changes and to Rate Timed Text for Online Video This section describes an example user interface that may be used according to method 700 with respect to FIGS. 9-12.

Figure 9:
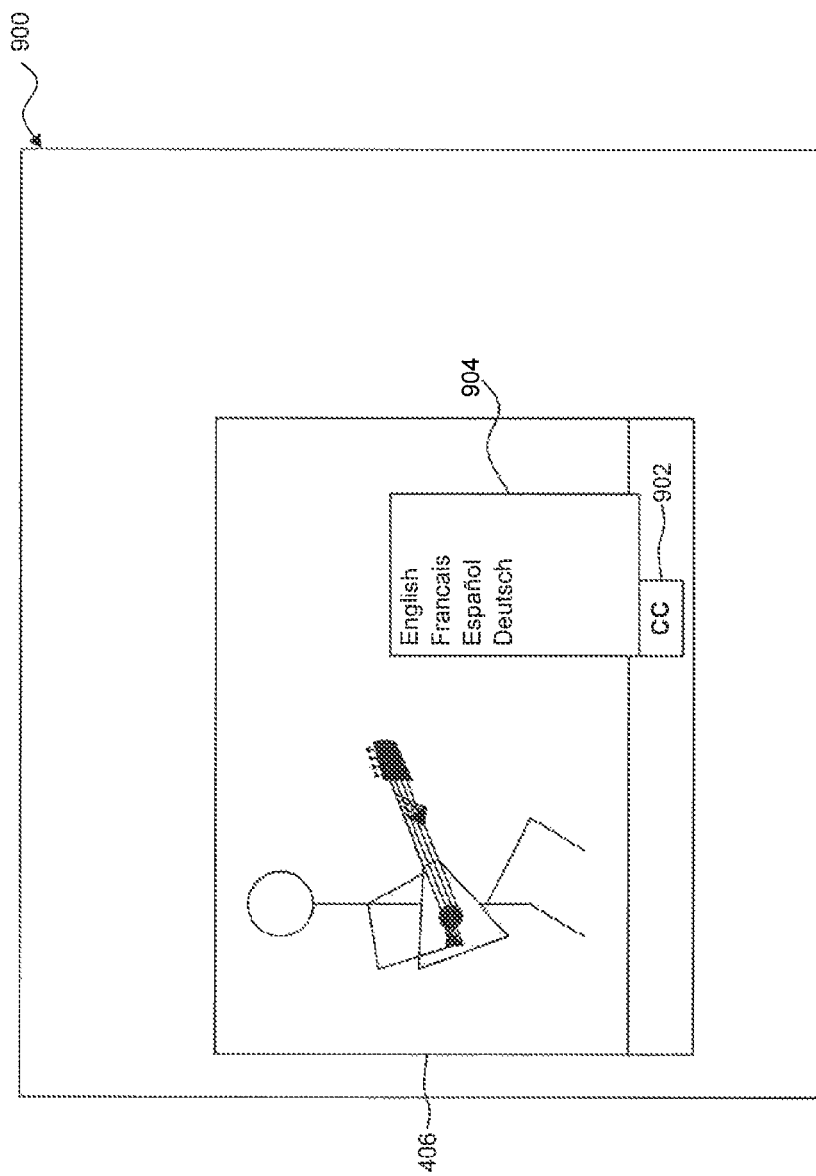
FIGS. 9-12 illustrate example user interface display that a viewer may use to rate or to suggest changes to timed text, which may be used by the system in FIG. 1 according to the method illustrated in FIGS. 7-8.

FIG. 9 contains example user interface 900. Example display 900 contains video viewer 406 playing a video. Video player 406 contains a closed caption button 902 that is currently pressed and shows various languages in a menu bar 904.

Figure 10:
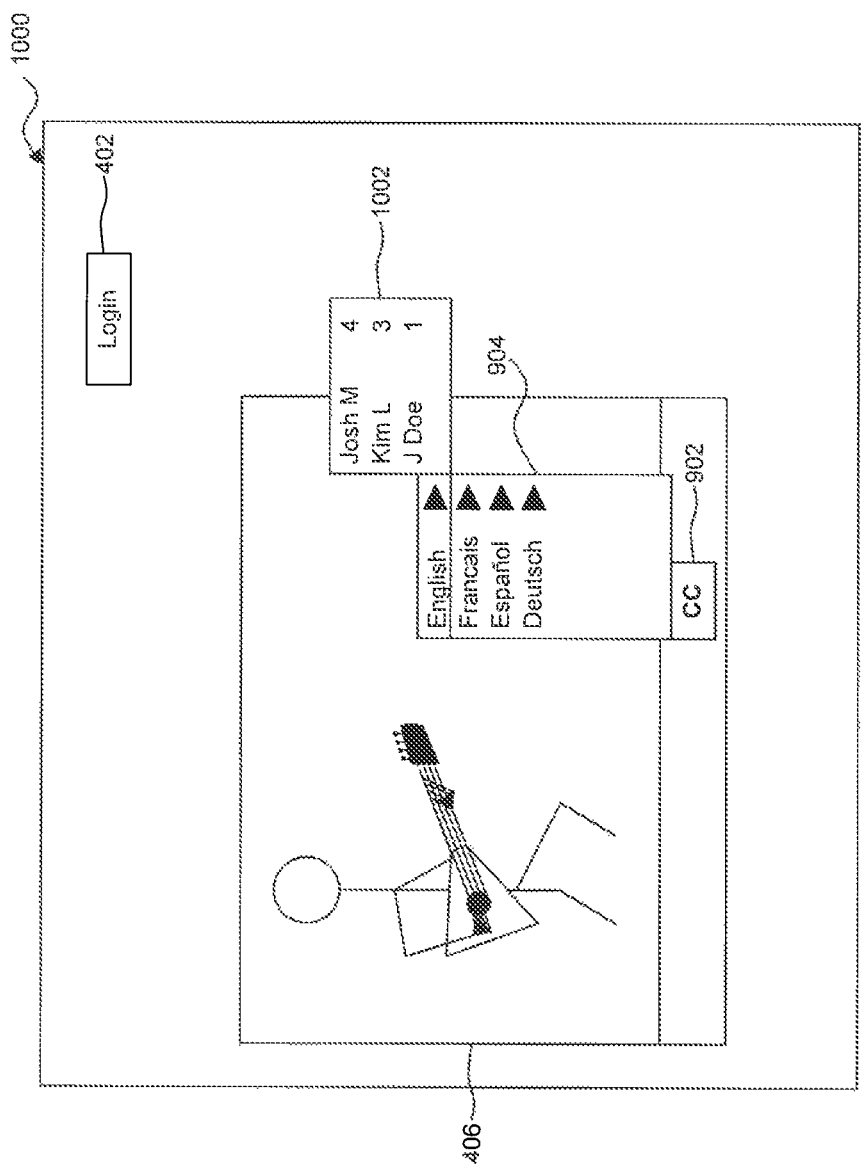

FIG. 10 shows a example user interface 1000. Example user interface 1000 is an example of how this display might appear after the user selects a particular language in menu bar 904. In this case, the user has selected the menu bar option "English" for menu bar 904. This opens various timed text options in the menu bar at 1002. That menu bar contains two columns. The first column contains user names of various captioners. The captioners displayed represent authors of timed text track for the video in video viewer 406. The second column contains the ratings corresponding to the timed text track. In an alternative, the rating display may be the ratings for the user as oppose to for the timed text.

Figure 11:
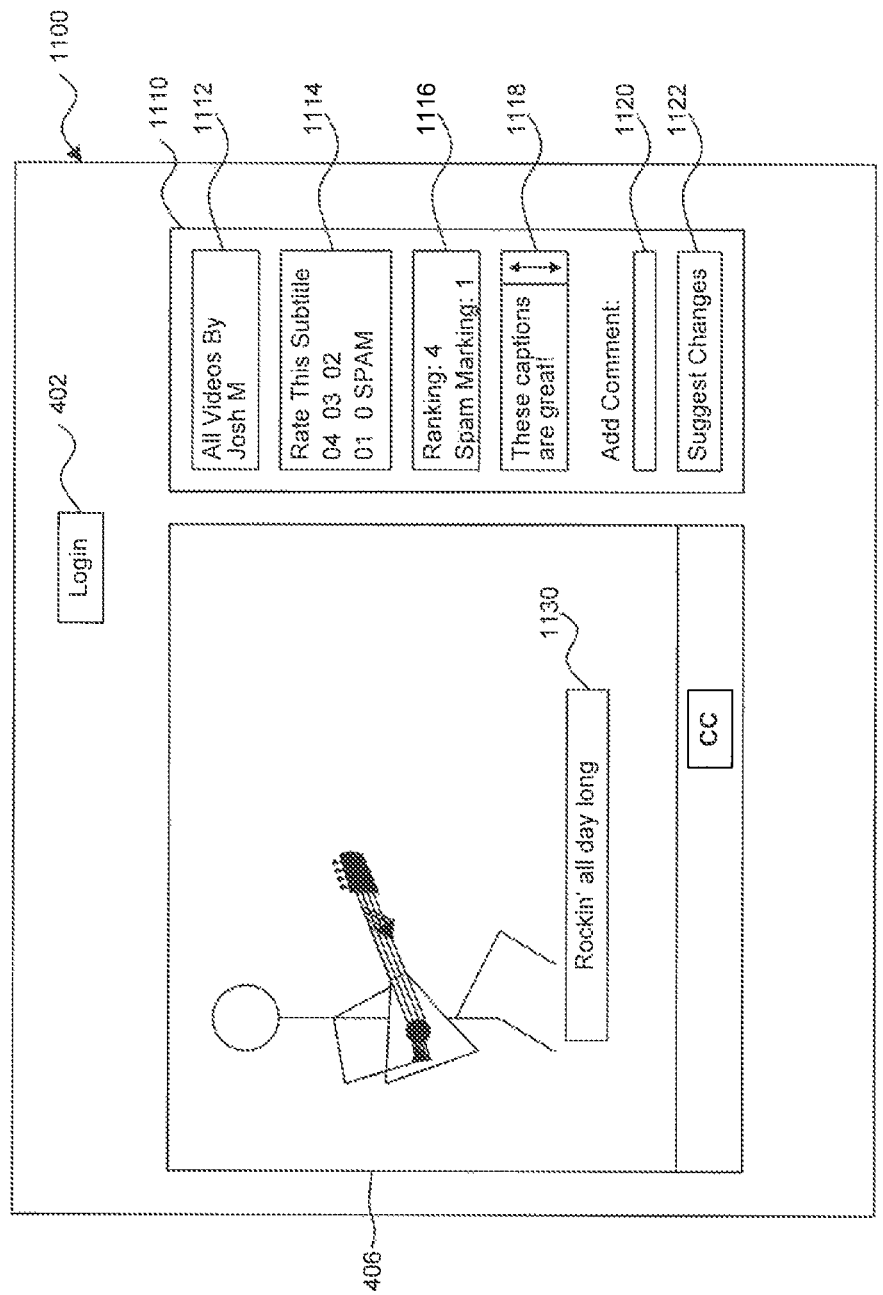

FIG. 11 shows an example user interface 1100. Example user interface 1100 may be the user interface display after the user has selected the Josh M video from menu bar 1002 in FIG. 10. Display 1110 contains a login button 402, a panel 1110 and a video player 406. Timed text authored by Josh M is being played timed text track at 1130.

Within panel 1110 there are several interface elements. Button 1112 displays all videos by Josh M. Radio button 1114 allows the viewer to rate this particular timed text track. The options are 1-4 and SPAM. At 1116, the present ranking of the video is displayed. In this case, the timed text track contains a ranking of four and one spam marking. At 1118, comments that other users may have provided about the set of timed text are displayed. Text box 1120 allows the viewer to add a comment relating to the timed text track. When selected, button 1122 enables the user to suggest changes to particular captioned track prior to the captioner.

Figure 12:
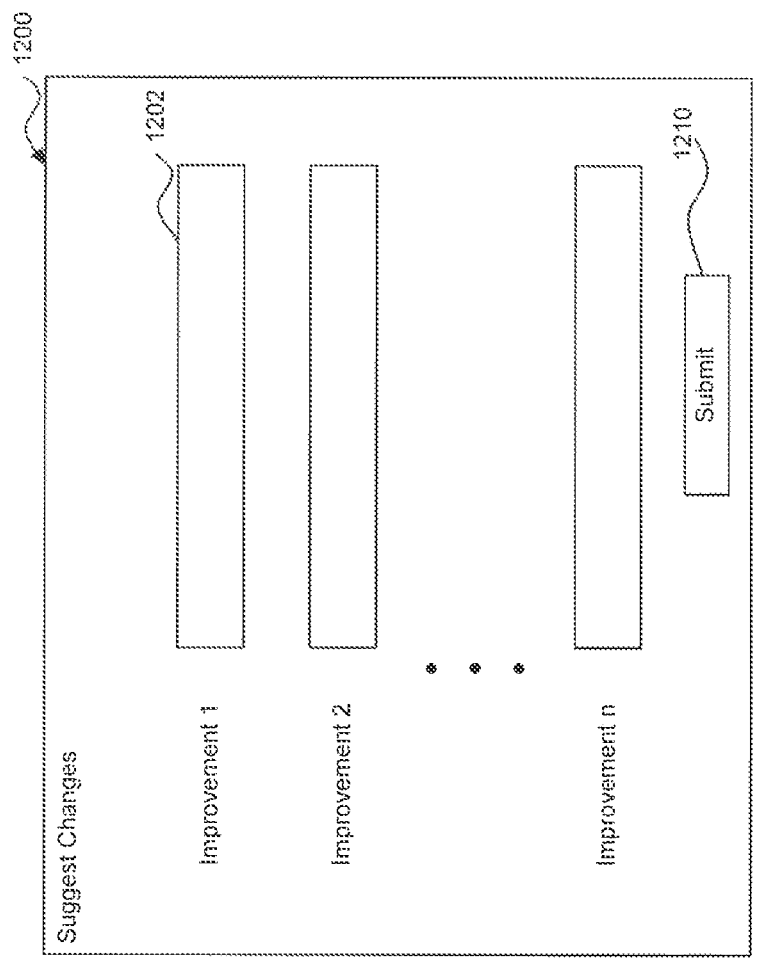

FIG. 12 contains an example user interface 1200. Example user interface 1200 is a form that allows the viewer to suggest changes to a particular context track. Multiple improvement inputs are provided at 1202. When pressed, submit button 1210 that submits the suggest changes across network 120 to video server 160. In an embodiment, change suggester 144 may send the data packaged in request 802, over a network 120 to video server 160 as shown in FIGS. 1 and 8.

By enabling users to suggest improvements to timed text tracks, example user interface 1200 enables users to collaborate over the web to create timed text for online video, while minimizing the risk of vandalism. This collaboration fosters the creation of additional high-quality timed text for online video.

Example User Interface Display for Caption Producers to Control Timed Text

FIG. 13 contains an example display that allows the caption producer to control which timed text are displayed and thus minimize the potential for vandalism. FIG. 13 contains example display 1300. In an embodiment, example display 1300 may be displayed by content manager 174. Example display 1300 contains various inputs and user interface elements. In FIG. 13 at 1302 there is an option to turn timed text off or turn timed text on for the entire video. Turning timed text here would turn off all timed text tracks for the video, and the user will be unable to display any timed text tracks for this particular video. At 1310 there is a table showing all the timed text tracks and their languages. Within the table there is an option either to enable or to disable each particular caption text. An example of an enabled captioned track is at 1312, an example of disabled captioned track is at 1314. Using these options the content producer can control which timed text are displayed and disable tracks that are poor quality or spam.

Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method, comprising:
   displaying, by a computing device, a timed text track created by a first user to a second user different from the first user, the timed text track specifying text to be displayed at various times within a video;
   enabling, by the computing device, the second user to suggest a change to content of the timed text track to the first user; and
   enabling, by the computing device, the first user to update the timed text track to match the change suggested by the second user.

2. The computer-implemented method of claim 1, further comprising:
   notifying the first user of the change suggested by the second user.

3. The computer-implemented method of claim 2, wherein the notifying comprises sending an email message, SMS message, or chat message.

4. The computer-implemented method of claim 2, wherein the suggested change further comprises a rating.

5. The computer-implemented method of claim 1, further comprising:
   enabling the second user to select the timed text track from a plurality of timed text tracks for the video.

6. The computer-implemented method of claim 5, wherein the enabling the second user to select the timed text track comprises:
   receiving a first user input selection identifying a language;
   receiving a second user input selection identifying the first user; and
   selecting a timed text track from the plurality of timed text tracks such that the selected timed text track is created by the identified first user and includes text in the identified language.

7. A system, comprising:
   a video player that displays a timed text track created by a first user to a second user different from the first user, the timed text track specifying text to be displayed at various times within a video;
   a change suggester that enables the second user to suggest a change to content of the timed text track to the first user;
   a timed text editor that enables the first user to update the timed text track to match the change suggested by the second user; and at least one computing device that implements the video player, the change suggester, and the timed text editor.

8. The system of claim 7, wherein the change suggester further notifies the first user of the change suggested by the second user.

9. The system of claim 8, wherein the notifying comprises sending an email message, SMS message, or chat message.

10. The system of claim 8, wherein the suggested change further comprises a rating.

11. The system of claim 7, wherein the video player further enables the second user to select the timed text track from a plurality of timed text tracks for the video.

12. The system of claim 7, wherein the video player further:
   receives a first user input selection identifying a language;
   receives a second user input selection identifying the first user; and
   selects a timed text track from the plurality of timed text tracks such that the selected timed text track is created by the identified first user and includes text in the identified language.

13. A non-transitory computer readable storage medium having instructions stored thereon that, when executed by a computing device, perform operations comprising:
   displaying a timed text track created by a first user to a second user different from the first user, the timed text track specifying text to be displayed at various times within a video;
   enabling the second user to suggest a change to content of the timed text track to the first user; and
   enabling the first user to update the timed text track to match the change suggested by the second user.

14. The non-transitory computer readable storage medium of claim 13, the operations further comprising:
   notifying, by the computing device, the first user of the change suggested by the second user.

15. The non-transitory computer readable storage medium of claim 14, wherein the notifying comprises sending an email message, SMS message, or chat message.

16. The non-transitory computer readable storage medium of claim 14, wherein the suggested change further comprises a rating.

17. The non-transitory computer readable storage medium of claim 13, the operations further comprising:
   enabling the second user to select the timed text track from a plurality of timed text tracks for the video.

18. The non-transitory computer readable storage medium of claim 17, wherein the enabling the second user to select the timed text track comprises:
   receiving a first user input selection identifying a language;
   receiving a second user input selection identifying the first user; and
   selecting a timed text track from the plurality of timed text tracks such that the selected timed text track is created by the identified first user and includes text in the identified language.

* * * * *

UNITED STATES PATENT AND TRADEMARK OFFICE
CERTIFICATE OF CORRECTION

PATENT NO.        : 8,505,062 B1  
APPLICATION NO.   : 13/173955  
DATED             : August 6, 2013  
INVENTOR(S)       : Kenneth Harrenstien It is certified that error appears in the above-identified patent and that said Letters Patent is hereby corrected as shown below:

Title Page, item (12), spelling of Inventor last name is "Harrenstien"  
    Title Page, item (75), spelling of Inventor last name is "Harrenstien"

Signed and Sealed this  
Sixteenth Day of September, 2014

Michelle K. Lee  
*Deputy Director of the United States Patent and Trademark Office*